United States Patent [19]
Schreck et al.

[11] Patent Number: 5,550,379
[45] Date of Patent: Aug. 27, 1996

[54] ZERO GAIN SETTING FOR DISCRETE EVENT PROCESSING

[75] Inventors: Zoltan Schreck, Ville de Léry; Benoit Venne, Montreal, both of Canada

[73] Assignee: Park Medical Systems Inc., Lachine, Canada

[21] Appl. No.: 354,546

[22] Filed: Dec. 13, 1994

[51] Int. Cl.⁶ .................. G01T 1/208; G01T 1/161
[52] U.S. Cl. ........................ 250/369; 250/363.07
[58] Field of Search .................... 250/363.09, 369, 250/363.07

[56] References Cited

U.S. PATENT DOCUMENTS

| | | |
|---|---|---|
| 4,475,042 | 10/1984 | Arseneau . |
| 4,629,894 | 12/1986 | Lelong . |
| 4,812,656 | 3/1989 | Yamakawa et al. . |
| 4,882,680 | 11/1989 | Bonnefoy-Claudet et al. . |
| 5,270,547 | 12/1993 | Stark et al. . |
| 5,309,357 | 5/1994 | Stark et al. . |

FOREIGN PATENT DOCUMENTS

| | | | |
|---|---|---|---|
| 2633929 | 2/1977 | Germany | 250/363.07 |
| 60-102582 | 6/1985 | Japan | 250/363.07 |
| 63-85486 | 4/1988 | Japan | 250/369 |
| 2-284088 | 11/1990 | Japan | 250/369 |

*Primary Examiner*—Carolyn E. Fields
*Assistant Examiner*—Edward J. Glick
*Attorney, Agent, or Firm*—Chilton, Alix & Van Kirk

[57] ABSTRACT

A control circuit for a scintillation camera is provided in which only discrete scintillation events are processed. When a scintillation event arrives, all light intensity signals below a predetermined threshold, indicating that the signals below the thresholds are not likely to be involved in the event, are blocked from the sum signal. The valid event discrimination circuit disclosed considers the sum signal of light intensity signals originating from only those photodetectors whose output signals are above the threshold. Valid event discrimination is not adversely affected by signals coming from photodetectors not involved in the event after the threshold detection takes place.

3 Claims, 2 Drawing Sheets

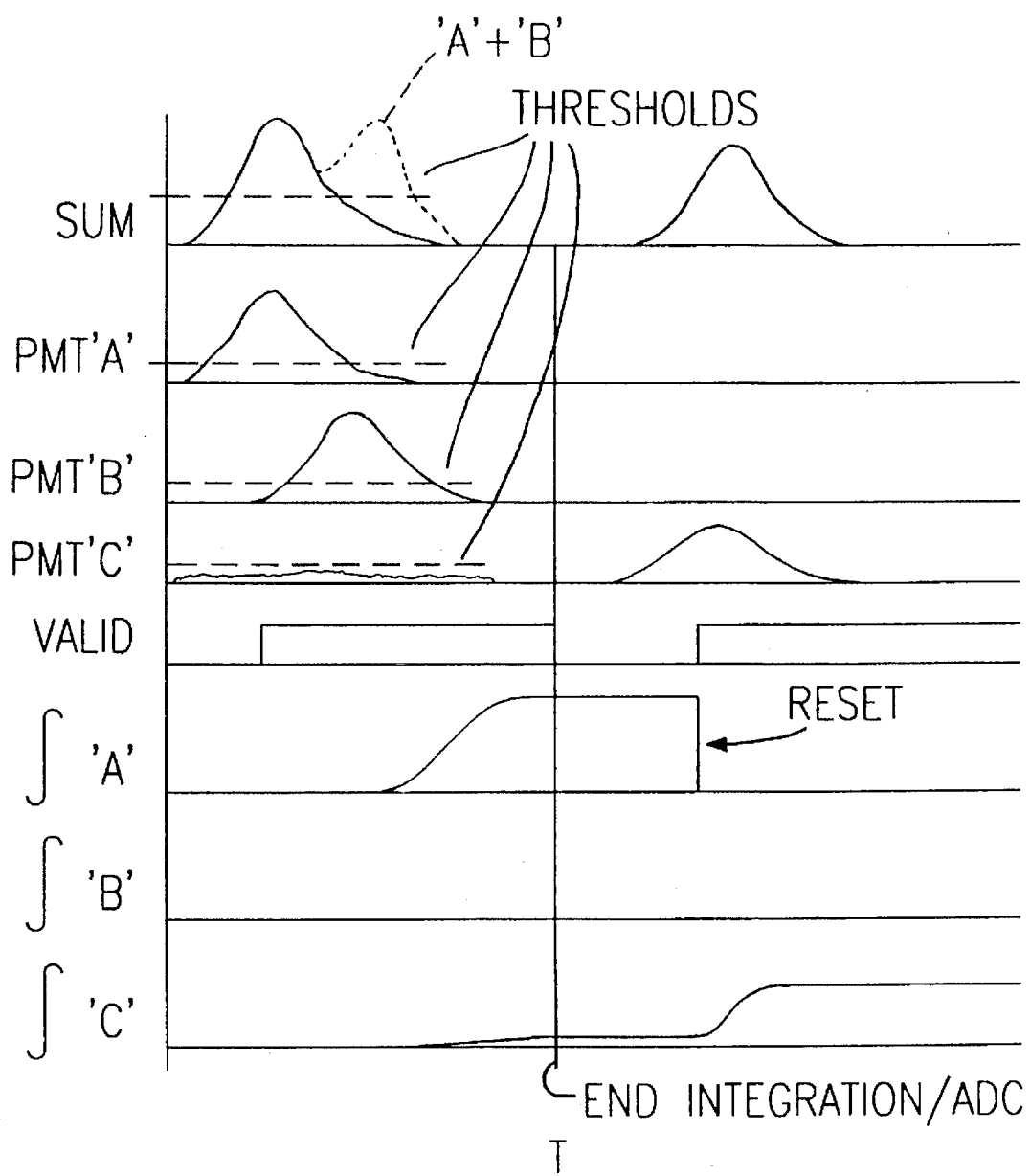

5,550,379

ZERO GAIN SETTING FOR DISCRETE EVENT PROCESSING

FIELD OF THE INVENTION

The present invention relates to a control circuit and method for a scintillation camera in which light intensity signals from photodetectors in the camera are integrated. More particularly, the invention provides improved valid event discrimination for discrete event processing.

BACKGROUND OF THE INVENTION

In scintillation cameras used in medical imaging, it is known to integrate the light intensity signals generated by a planar array of photodetectors in response to scintillation light produced in a scintillator optically coupled to the photodetectors. The integrated intensity signals are used as energy signals in the computation of the scintillation event's total energy and the scintillation events positions within the scintillator for the purposes of accurate image construction.

In recent years, position calculation in scintillation cameras has started to be implemented using digital computers and the integrated intensity signals from the photodetectors have been converted to digital energy values using analog-to-digital converters connected to an integrator associated with each photodetector. Such a system is illustrated in U.S. Pat. No. 5,309,357 in which integrators receive photodetector intensity signals which are delayed by an appropriate period of time required able to determine whether the sum signal of all light intensity signals is indicative of a valid scintillation event. A valid scintillation event is determined to be one in which the light produced by the scintillator corresponds to an energy of a photon emitted by a particular radioactive isotope ingested or applied to the medical patient being imaged. This is typically done by analyzing a sum signal of all light intensity signals from the photodetectors. Such a system is known from U.S. Pat. No. 5,270,547.

In the circuitry described in U.S. Pat. No. 5,309,357, integration and analog-to-digital conversion is carried out in one of two ways. In the first way, integration and analog-to-digital conversion is only carried out on a group of the delayed intensity signals after it has been determined that there has been a valid scintillation event in the camera during a time frame in which the group had a substantial signal. In the second way, all light intensity signals are integrated and then converted into a serial digital format each time a valid event in the camera is detected.

In the known art, multiple events, i.e. two or more scintillations occurring with overlapping time frames, cause problems or complications in data processing in the camera. The camera circuitry must be designed with a view to clearly identify valid events and produce integration energy signals which are accurate and free from interference. When the energy signals include interference, the resulting image produced by the scintillation camera will be flawed or blurred.

Multiple events also complicate the process of valid event discrimination. For example, when a first event occurs in one portion of the scintillator, and then within the same time frame another event begins elsewhere in the scintillator, the valid event discriminator must determine whether the double peak multiple event includes a valid event.

SUMMARY OF THE INVENTION

It is an object of the present invention to provide a control circuit for a scintillation camera in which only discrete scintillation events are processed. A global valid signal is generated in response to detecting a signal level above a predetermined threshold in the camera. In response to this valid signal, the individual photodetector signals are compared to a minimum threshold and those signals which are below the threshold are blocked from consideration for the remainder of the event by the valid event discrimination circuit and preferably also the associated integrators. The valid event discrimination circuitry considers then only discrete events without disturbances by multiple events occurring within a predetermined time frame and processing of the integrated signals which preferably exclude signals from subsequent events is made easier.

Accordingly, it is an object of the invention to provide a circuit in which it is determined which photodetectors are producing light intensity signals coming from the scintillation event and thereafter for the scintillation event, ignoring intensity signals from a remainder of the photodetectors. As will become clear hereinbelow, such "ignoring" can be achieved at any one of a plurality of stages in the processing of the light intensity signals, for example, at the integrators, in the valid event discrimination circuit, or at the individual variable gain amplifiers amplifying the light intensity signals.

The invention provides a control circuit for a scintillation camera comprising a planar array of photodetectors generating light intensity signals on light intensity signal outputs in response to scintillation light produced in a scintillator optically coupled to the photodetectors, and a plurality of integrators each receiving one of the intensity signals. The control circuit comprises a threshold comparator connected to each of the photodetector intensity outputs and producing a comparison output when the signals are above a predetermined threshold. A global signal detection means for producing a valid signal indicating that a scintillation event is in progress in the scintillator; a valid event determination circuit including a summing circuit connected to the light intensity outputs; said valid event determination circuit producing an event output trigger signal; a summing circuit control means connected to said intensity outputs for preventing the summing circuit from summing for a remainder of said event certain ones of the intensity signals for which the comparison output is absent at a beginning of the valid signal. In this way, the valid event determination is based on the sum of only those intensity signals above the predetermined threshold at the beginning of the scintillation event.

BRIEF DESCRIPTION OF THE DRAWINGS

The invention will be better understood by way of the following detailed description of a preferred embodiment with reference to the appended drawings in which:

FIG. 2 is a mock time diagram illustrating the discrete signals.

DETAILED DESCRIPTION OF THE PREFERRED EMBODIMENT AND OTHER EMBODIMENTS

Figure 1:
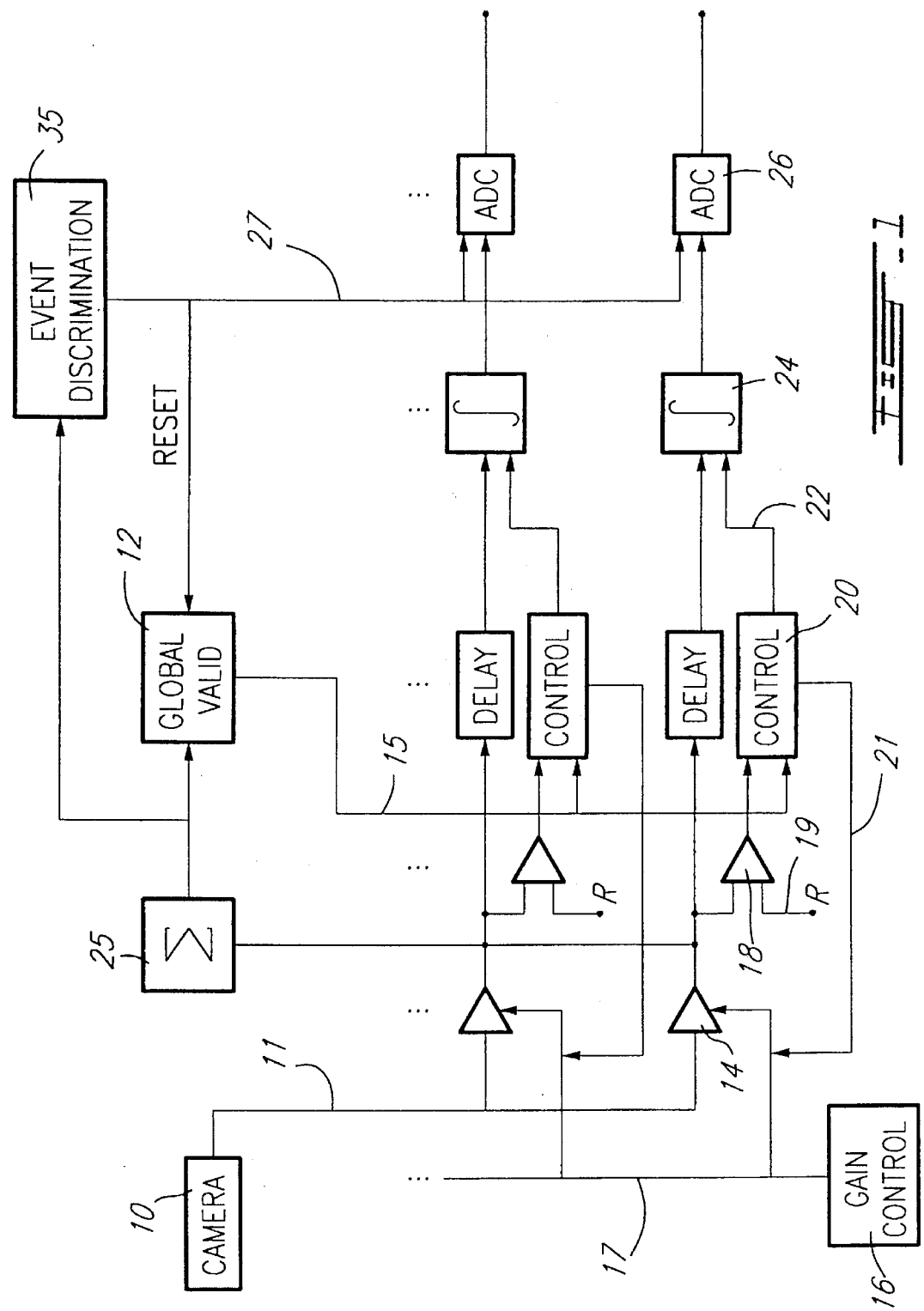
FIG. 1 is a schematic block diagram illustrating the scintillation camera control circuit according to the preferred embodiment in which automatic gain control with variable amplifiers is implemented.

In the preferred embodiment illustrated in FIG. 1, a scintillation camera 10 includes a scintillator having a planar array of photodetectors optically coupled to a side surface of a scintillator as is known in the art. The photodetectors or photomultiplier tubes generate light intensity signals on a bundle of output lines 11 each connected to a variable amplifier 14. Each variable amplifier 14 is controlled to produce a level of gain determined to be appropriate during an initial calibration. A gain control reference level generator 16 provides the appropriate gain signals for each of the variable amplifiers 14 on a bus 17. The outputs of the variable amplifiers 14 are fed to a summing circuit 25 whose output is fed into a valid event discriminator circuit 35 and a global valid signal generator circuit 12.

The valid event discriminator circuit 35, according to the present invention, determines two factors. The two factors are shape and energy. The shape is the rise slope and peak value. The energy is an integration of the sum signal. When it has been determined that the two factors are met, the event is valid, and an output signal on line 27 is produced to cause the analog-to-digital converters 26 to convert the output from each integrator 24.

When the valid signal 15 is generated, a control unit 20 associated with each photodetector determines whether the light intensity signal coming from its photodetector is above a given threshold voltage level R using a comparator 18 and voltage reference 19. If the level of the intensity signal is above the threshold, the control unit 20 may provide a rapid initial reset of integrator 24 in order to clear any previous noise, and then integrator 24 is enabled to begin integrating. The integrator 24 receives the amplified signal of each light intensity signal from the photodetectors. If at the moment the valid signal is produced on line 15, the light intensity signal associated with the control unit 20 is below the predetermined threshold, the control unit 20 resets integrator 24 using its output line 22 connected to a reset input of integrator 24 and at the same time control unit 20 causes the variable gain setting of amplifier 14 to drop to zero gain using its output line 21. As the gain is brought to zero, the reset integrator 24 continues to receive a zero signal and will thus produce a zero integration signal. The control unit 20 will allow the gain setting from line 17 to restore the usual variable gain setting of amplifier 14 once the valid signal on line 15 is discontinued.

As can be appreciated, the summing circuit 25 will produce the effective sum of only those photodetector intensity signals involved in the event responsible for the generation of the valid signal. Should another event take place within the time frame of the first event, light from the other event will not disturb the sum signal and consequently the valid event determination in circuit 35, unless the other event is proximate the photodetectors whose gain has not been reset to zero. In this way, the valid event determination in circuit 35 and the subsequent output on line 27 is based on only a fraction of the intensity signals from the planar array of photodetectors, those signals involved in the determination being those involved in receiving light from an event within a very brief period of time at the very beginning of an event. If it is determined on the basis of those intensity signals that a valid scintillation event from a photon emission has taken place, then a conversion signal on line 27 is output to the analog-to-digital converters for a quick conversion of the signals coming from integrators 24. While the signals of all integrators are being converted, the integrators will have integrated only those signals from the first event.

With references to FIGS. 1 and 2, the signal processing according to the invention will be described. The graph in FIG. 2 shows the intensity signals coming from three photodetectors labeled as PMT 'A', 'B' and 'C' as well as exemplary signals for the sum signal generated by circuit 25, the valid signal 15 and the integrator output signal from integrators 24 associated with the photodetectors A, B and C. When the sum signal crosses a threshold in its early stages, a valid signal is generated by circuit 12. Given the short time span of the scintillation event, the arrival of the valid signal 15 comes somewhat after the crossing of the threshold. The control circuits then act on the comparison signals of each photodetector 'A', 'B' and 'C' with respect to a relatively low threshold as indicated. In FIG. 2, only the signal from PMT 'A' is above the threshold and therefore permitted to be integrated. In the case of PMT 'B' and 'C', the gain of their associated amplifiers 14 is set to zero and further consideration of signals from those PMTs is disregarded. As illustrated in FIG. 2, this prevents the substantial signal arriving on PMT 'B' from being included in the sum signal which would normally produce a second peak as illustrated in dotted lines as 'A'+'B'. The signals from amplifiers 14 are fed into a delay circuit as shown in FIG. 1 before being passed on to integrators 24. The integrators output integrated signals for each photodetector and when the valid event discrimination circuit 35 determines that the event represented by the sum signal was valid and as a result produces an event output trigger signal on line 27, the ADCs 26 convert the integration signals to produce digital intensity signals. The trigger signal 27 is also shown in FIG. 1 to reset the global signal detection circuit 12. As is seen in FIG. 2, zero results will be produced for photodetectors 'B' and 'C' while photodetector 'A' will produce an intensity signal from the valid event. If the event is determined to be invalid, no conversion takes place and the control circuits 20 will reset the previous signals on the integrators at the beginning of the next event.

As can be appreciated, the present invention reduces the chances that the digital energy values are anything but the result from a single valid scintillation event. Although the preferred embodiment illustrates setting the gain of the analog light intensity signals to zero in order to control whether those signals are considered in the valid event discrimination process or integrated by the integrators, it is possible to implement other means to achieve the same object, such as electronic switches or disabling circuits as are known in the art either in the context of the integrators or in the context of producing the sum signal. The end result of the present invention is to recognize a scintillation event in its relatively early stages, and then to concentrate on the one event by ignoring activity in the camera not initially involved in the scintillation event until the event is over.

Although the global valid signal generator has been described hereinabove as being based on the sum signal level, it would alternatively be possible to generate the valid signal by considering individual light intensity signal levels. For example, each light intensity signal could be compared to two different thresholds. If the first and higher threshold is surpassed when no valid signal is present on a line 15, then the control circuit 20 of the photodetector undertakes the responsibility of generating the valid signal on line 15. If at the time the valid signal is generated, any other control circuit 20 whose associated light intensity signal is above the second predetermined threshold (lower standard threshold) would undertake to allow its associated signal to participate in the sum signal 25 and its associated integrator 24 to integrate the light intensity signal, whereas if at the moment the valid signal is produced the associated light intensity signal is below the lower threshold, the control circuit undertakes to prevent the integrator from integrating the associated light intensity signal and to prevent the intensity from being summed.

What is claimed is:

1. A control circuit for a scintillation camera comprising a planar array of photodetectors generating light intensity signals on photodetector outputs in response to scintillation light produced in a scintillator optically coupled to the photodetectors, and a plurality of integrators each receiving one of said intensity signals, the control circuit comprising:

a threshold comparator connected to each of said photodetector outputs and producing a comparison output when said intensity signals are above a predetermined threshold;

a global signal detection means for producing a valid signal indicating their a scintillation event is in process in said scintillator;

a valid event determination circuit including a summing circuit connected to said photodetector outputs, said valid event determination circuit producing an event output trigger signal;

a summing circuit control means connected to said photodetector outputs for preventing said summing circuit from summing for a remainder of said event certain ones of said intensity signals for which said comparison output is absent at a beginning of said valid signal, whereby valid event determination is based on the sum of only those intensity signals above the predetermined threshold at the beginning of said scintillation event.

2. The control circuit as claimed in claim 1, wherein said summing circuit control means comprise variable amplifier means for setting the gain of amplifiers amplifying said light intensity signals to zero for those intensity signals being below said predetermined threshold at said beginning of said valid signal.

3. The control circuit as claimed in claim 1, further comprising integration disable control means for preventing said integrators from integrating said intensity signals during a portion of said event when said comparison output indicates that said intensity signals are below said threshold when said valid signal is generated.

* * * * *